United States Patent
Way et al.

(10) Patent No.: US 9,109,059 B2
(45) Date of Patent: Aug. 18, 2015

(54) SUPERABSORBENT POLYMERS

(71) Applicant: Industrial Technology Research Institute, Hsin Chu (TW)

(72) Inventors: Tun-Fun Way, Hsinchu (TW); Kelly Teng, Taipei (TW); En-Kuang Wang, Hsinchu (TW); Yu-Ting Chen, Changhua County (TW); Jiun-Jy Chen, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/720,087

(22) Filed: Dec. 19, 2012

(65) Prior Publication Data

US 2013/0171737 A1    Jul. 4, 2013

(30) Foreign Application Priority Data

Dec. 30, 2011    (TW) .............................. 100149763 A

(51) Int. Cl.
| | | |
|---|---|---|
| C08F 120/06 | (2006.01) | |
| C08F 220/06 | (2006.01) | |
| C08F 222/02 | (2006.01) | |
| C08F 222/38 | (2006.01) | |

(52) U.S. Cl.
CPC ............. *C08F 120/06* (2013.01); *C08F 220/06* (2013.01); *C08F 222/02* (2013.01); *C08F 222/385* (2013.01); *Y10T 436/201666* (2015.01)

(58) Field of Classification Search
USPC ........................................ 526/318.2; 436/129
See application file for complete search history.

(56) References Cited

U.S. PATENT DOCUMENTS

| | | | |
|---|---|---|---|
| 4,314,044 A | 2/1982 | Hughes et al. | |
| 5,013,769 A | 5/1991 | Murray et al. | |
| 5,163,115 A | 11/1992 | Sheu | |
| 5,574,121 A * | 11/1996 | Irie et al. ................... | 526/318.44 |
| 5,597,873 A * | 1/1997 | Chambers et al. .......... | 525/330.1 |
| 6,417,425 B1 | 7/2002 | Whitmore et al. | |
| 7,429,632 B2 | 9/2008 | Mitchell | |
| 8,137,746 B2 | 3/2012 | Schmidt et al. | |
| 2003/0219600 A1 | 11/2003 | Mitchell et al. | |
| 2009/0324839 A1 | 12/2009 | Klippel et al. | |

FOREIGN PATENT DOCUMENTS

| | | |
|---|---|---|
| CN | 1587289 A | 3/2005 |
| CN | 1970594 A | 5/2007 |
| CN | 101679566 A | 3/2010 |
| EP | 0614921 B1 | 8/1997 |
| JP | 55058205 A | 4/1980 |
| TW | 591039 B | 6/2004 |
| TW | 95111116 | 1/2007 |

OTHER PUBLICATIONS

Rodriguez, et al., "Some Mechanical Properties of Poly[(acrylic acid)-co-(itaconic acid)] Hydrogels", Macromol. Mater. Eng. vol. 288, pp. 607-612, 200.*
Pulat, et al., "Determination of Swelling Behavior and Morphological Properties of Poly(acrylamide-co-itaconic acid) and Poly(acryllc acid-co-itaconic acid) Copolymeric Hydrogels", Journal of Applied Polymer Science, vol. 102, pp. 5994-5999, 2006.*
Lee, et al., "Superabsorbent Polymeric Materials. I. Swelling Behaviors of Crosslinked Poly(sodium acrylate-co-hydroxyethyl methacrylate) in Aqueous Salt Solution", Journal of Applied Polymer Science, vol. 62, pp. 1099-1114, 1996.*
Çaykara, et al., Investigation of Thermal Behavior of Poly(2-hydroxyethyl methacrylate-*co*-itaconic acid) Networks:, Journal of Applied Polymer Science, vol. 103, pp. 1602-1607, 2007.
Rodriguez, et al., "Some Mechanical Properties of Poly[(acrylic acid)-*co*-(itaconic acid)] Hydrogels", Macromol. Mater. Eng. vol. 288, pp. 607-612, 2003.
Pulat, et al., "Determination of Swelling Behavior and Morphological Properties of Poly(acrylamide-*co*-itaconic acid) and Poly(acrylic acid-*co*-itaconic acid) Copolymeric Hydrogels", Journal of Applied Polymer Science, vol. 102, pp. 5994-5999, 2006.
Huanp et al "Synthesis of Poly(Acrylic Acid-Co-Itaconk Acid) in Carbon Dioxide-Methanol Mixtures" Journal of Macromolecular Science vol. 39, pp. 27-38. 2002.
Suo et al "Synthesis and Properties of Carboxymethyl Cellulose-*graft*-Poly(Acrylic Acid-*co*-Acrylamide) as a Novel Cellulose-Based Superabsorbent" Journal of Applied Polymer Science vol. 103, pp. 1382-1388. 2007.
Liu et al "Preparation of Superabsorbent Slow Release Nitrogen Fertilizer by Inverse Suspension Polymerization" Polymer International vol. 56, pp. 729-737. 2007.
Foungfung et al "Acrylamide-Itaconic Acid Superabsorbent Polymers and Superabsorbent Polymer/Mica Nanocomposites" Polymers Advanced Technologies vol. 22, pp. 635-647. 2011.

* cited by examiner

*Primary Examiner* — Peter D Mulcahy
*Assistant Examiner* — Henry Hu
(74) *Attorney, Agent, or Firm* — Cesari and McKenna, LLP

(57) ABSTRACT

A superabsorbent polymer network formed of two monomers and two crosslinkers. The monomers and the crosslinkers are described herein. Further, a method for preparing this superabsorbent polymer network is disclosed. Also disclosed is a method of determining a ratio between two monomeric moieties in a superabsorbent polymer network formed of two monomers.

16 Claims, No Drawings

US 9,109,059 B2

SUPERABSORBENT POLYMERS

CROSS REFERENCE TO RELATED APPLICATION

This application claims priority to Taiwan Patent Application No. 100149763, filed on Dec. 30, 2011.

BACKGROUND

Superabsorbent polymers (SAPs) have wide applications. For example, they are used in a variety of medical and hygiene products.

These polymers, as hydrophilic crosslinked networks, have high water absorbing capacity. In deionized water, current SAP networks can absorb 900 times its weight, i.e., a water absorbency of 900 g/g. However, they are not very effective in salt-containing water. In a 0.9% saline solution, their water absorbency drops significantly to about 70 g/g. See Jim Sheu, U.S. Pat. No. 5,163,115. In a pressurized saline solution, their water absorbency decreases further to about 35 g/g.

Itaconic acid is widely used as a monomer to prepare SAP networks. In general, it is co-polymerized with another monomer, e.g., acrylic acid and acrylamide. The copolymers thus formed are then crosslinked to form a SAP network. See Rodriguez and Katime, Macromolecular Materials and Engineering, 288, 607-12 (2003). Itaconic acid has two polar carboxyl groups, which attribute to the hydrophilicity and thus water absorbency of the SAP network. Chain transfer reactions are common in itaconic acid copolymerization, resulting in low-molecular-weight SAP networks. Such networks, which have low crosslinking density and low mechanical strength, absorb water poorly in a pressurized saline solution. See Rodriguez and Katime (2003); and Pulat and Eksi, Journal of Applied Polymer Science, 102, 5994-99 (2006).

There is a need for a salt- and pressure-tolerant SAP network having high water absorbency.

SUMMARY

The SAP network of this invention shows unexpectedly high water absorbency in a saline or pressurized solution.

One aspect of this invention relates to a SAP network formed of 8 to 23 mole % (e.g., 12 to 20 mole %) a first monomer, 75 to 92 mole % (e.g., 79 to 87 mole %) a second monomer, 0.1 to 1 mole % (e.g., 0.2 to 0.3 mole %) a first crosslinker, and 0.2 to 1.5 mole % (e.g., 0.3 to 1.2 mole %) a second crosslinker. The SAP network can contain (i) copolymers of the first monomer and the second monomer, the copolymers being bonded by both the first and the second crosslinkers; (ii) the copolymers and homopolymers of the first monomer, the copolymers and the homopolymers being bonded by both the first and the second crosslinkers; (iii) the copolymers and homopolymers of the second monomer, the copolymers and the homopolymers being bonded by both the first and the second crosslinkers; or (iv) the homopolymers of the first monomer and the homopolymers of the second monomer, both homopolymers being bonded by both the first and the second crosslinkers. The just-mentioned SAP network optionally contains one or more other chemical entities, e.g., polyvalent cations, tertiary amines, and fragrances.

The first monomer can be a $C_1$-$C_{10}$ alkene containing two or more carboxyl groups, or at least one carboxyl group and at least one amide group. Examples are itaconic acid, fumaric acid, itaconamic acid, maleic acid, methyl maleic acid, and a combination thereof.

The second monomer can be a $C_1$-$C_{10}$ alkene containing only one functional group that is a carboxyl group or an amide group. Examples are acrylic acid, 2-hydroxyethyl methacrylate, methacrylic acid, acrylamide, methacrylamide, acryloxypropionic acid, and a combination thereof.

The first crosslinker can be a $C_1$-$C_{20}$ acryloyl compound containing two or more acrylamide groups, two or more acrylate groups, or at least an acrylaminde group and at least an acrylate group. Examples are N,N'-methylene bisacrylamide, N,N'-ethylene bisacrylamide, 1,3-propylene bisacrylamide, ethylene diacrylate, di(ethylene glycol) diacrylate, tri(ethylene glycol) diacrylate, trimethylolpropane triacrylate, pentaerythritol triacrylate, and a combination thereof.

The second crosslinker can be a $C_1$-$C_{20}$ hydroxyl or amine compound containing two or more hydroxyl groups, two or more amine groups, or at least one hydroxyl group and at least one amine group. Examples are ethylene glycol, diethylene glycol, triethylene glycol, propanediol, butanediol, pentanediol, hexanediol, glycerol, propane trimethylol, pentaerythritol, methylenediamine, ethylenediamine, trimethylenediamine, and a combination thereof.

Another aspect of the invention relates to a process of preparing the above-described SAP network.

Also within the scope of this invention is a method of determining the ratio between two monomeric moieties in a SAP network.

The details of one or more embodiments of the invention are set forth in the description below. Other features, objects, and advantages of the invention will be apparent from the description and the claims.

DETAILED DESCRIPTION

The SAP of this invention contains copolymers of a first monomer and a second monomer, homopolymers of the first monomer, homopolymers of the second monomer, or a combination thereof. Of note, the copolymers and both homopolymers are bonded by two crosslinkers, i.e., the first and second crosslinkers described above.

The mole % of a monomeric moiety in a SAP is calculated as follows: the moles of the monomeric moiety/(the moles of the first and second monomeric moieties)×100%. Exemplary contents of the first and second monomeric moieties in the SAP of this invention are 8 to 23 mole % (preferably, 12 to 20 mole %) and 75 to 92 mole % (preferably, 79 to 87 mole %), respectively.

Examples of the first monomer include the carboxylic acids listed in the Summary section above. The term "carboxylic acid" herein refers to acids, as well as carboxylate anions and carboxylate salts.

Examples of the second monomer include the carboxylic acids and carboxylic acid derivatives listed in the Summary section above. The term "carboxylic acid derivative" refers to esters, amides, acyl halides, acid anhydrides, and imides.

The first monomer and the second monomer form copolymers in a polymerization reaction, e.g., a free radical reaction.

Turning to the first crosslinker, it bonds polymers (i.e., copolymers, homopolymers, or both) to form a SAP. The crosslinking reaction can be a free radical reaction that takes place during the polymerization. Examples of the first crosslinker include bisacrylamides, diacrylates, and triacrylates.

The second crosslinker, which can a hydroxyl or amine compound, further bonds the polymers already bonded together by the first crosslinker. The bonding can be achieved via an esterification or amidation reaction.

The mole % of a crosslinker is calculated as follows: the moles of the crosslinker/(the moles of the first and second monomers)×100%.

Also disclosed is a method of preparing an SAP of this invention. The method includes the steps of: (1) providing a mixture containing a first monomer, a second monomer, a first crosslinker, a second crosslinker, and an initiator in a solvent at 70 to 100° C. (e.g., 80° C.) to yield crosslinked copolymers formed of the first monomer, the second monomer, and the first crosslinker; and (2) raising the temperature of the mixture to 100-150° C. (e.g., 145° C.) to induce crosslinking between the copolymers and the second crosslinker thereby yielding the superabsorbent polymer network. The first and second monomers and the first and second crosslinkers are described above. The initiator, upon heating or irradiation, decomposes into free radicals, which induce both polymerization of the first and second monomers and bonding of the copolymers thus formed via the first crosslinker.

Further disclosed is a method of determining a ratio between two monomeric moieties in a SAP network. The method includes the steps of (1) providing a SAP network formed of crosslinked copolymers, each of the copolymers prepared from a first monomer and a second monomer; (2) selecting a hydrolysis condition using $D_2O$ as a solvent and $D_2SO_4$ as a catalyst, under which the copolymers are hydrolyzed to yield the first monomer and the second monomer, and the first and the second monomers thus yielded are stable; (3) reacting the SAP network under the hydrolysis condition to yield a hydrolysis mixture of the first monomer and the second monomer; and (4) determining a ratio of the first monomer to the second monomer in the mixture, thereby obtaining a ratio between two monomeric moieties in the SAP network. The ratio can be determined by nuclear magnetic resonance spectroscopy, high-performance liquid chromatography, or gas chromatography.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein, as well as the publication of the Taiwan Patent Application 100149763, are incorporated by reference in their entirety.

EXAMPLES 1-5

Procedures for Preparing SAPs

In these five examples and Examples 6-26, SAPs were prepared, tested, and analyzed following the procedures below.

NaOH (35% aqueous solution) was added to an aqueous solution of itaconic acid and acrylic acid with agitation until 70% of the acids were neutralized. To the mixture thus obtained were added a first crosslinker (e.g., N,N'-methylene bisacrylamide and N,N'-ethylene bisacrylamide), a second crosslinker (e.g., ethylene glycol, diethylene glycol, and triethylene glycol), and an initiator (e.g., 4,4'-azobis(4-cyanovaleric acid)). Under a nitrogen atmosphere, the mixture was heated to 80° C. to start a free radical polymerization reaction. Copolymers of the first monomer and the second monomer were formed, bonded by the first crosslinker at this temperature. The mixture became a gel. After an hour, the temperature of the mixture was raised to 145° C. to induce crosslinking (e.g., esterification) between the copolymers and the second crosslinker. The temperature was maintained for an hour to allow the completion of the reaction. The solid product was collected, washed with water, dried in an oven at 85° C. for 48 hours, and pulverized into particles having a size no more than 160 mesh.

The amounts of starting materials, reagents, and solvent were provided in these examples and Examples 6-25 below. The mole % of the initiator and the crosslinkers was based on the total moles of the first monomer and the second monomer, i.e., (amount of initiator or crosslinkers)/(amount of the first monomer and the second monomer). The mole % of the first monomer and the second monomer was also based on the total amount of the first monomer and the second monomer.

In Example 1, a SAP, i.e., SAP1, was prepared from itaconic acid (9 g, 0.07 mole), acrylic acid (21 g, 0.29 mole), N,N'-methylene bisacrylamide (0.15 g, 0.001 mole), triethylene glycol (0.21 g, 0.0014 mole), 4,4'-azobis(4-cyanovaleric acid) (0.4 g, 0.001 mole), NaOH (12.0 g, 0.3 mole), and water (70 g). The contents of itaconic acid and triethylene glycol were 19.5 mole % and 0.39 mole %, respectively.

In Examples 2-5, SAPs 2-5 were prepared using itaconic acid, acrylic acid, N,N'-methylene bisacrylamide, 4,4'-azobis(4-cyanovaleric acid), NaOH, and water in the same amounts as those used in Example 1. On the other hand, different amounts of triethylene glycol were used. More specifically, in Example 2, 0.42 g of triethylene glycol (0.0028 mole, 0.78 mole %) was used; in Example 3, 0.63 g (0.0042 mole, 1.17 mole %) was used; in Example 4, 0.96 g (0.0064 mole, 1.78 mole %) was used; and in Example 5, 1.28 g (0.0085 mole, 2.36 mole %) was used.

Comparative SAPs were also prepared without using itaconic acid.

More specifically, comparative SAPs 1'-5' were prepared in the same manner as SAPs 1-5, except that itaconic acid was not used and that 26 g, instead of 21 g, of acrylic acid was used.

Water Absorbency Assay

The following procedures were performed to quantify the absorbency values of the SAPs prepared in Examples 1-25 in a pressurized saline solution.

A SAP sample was placed in a bag (60×100 mm) made of nonwoven fabric. The weight of the sample was recorded (W1, about 0.2 g). The bag was immersed in a saline solution (0.9 wt %) for 2 hours at room temperature to allow the SAP to swell. It was taken out and centrifuged (i.e., pressurized) using a centrifugal separator (chamber diameter, 35 cm) for 6 min at 1250 rpm. The weight of the bag and the swollen SAP was measured (W2). The empty bag was also weighted (W0). The swelling capacity (i.e., absorbency, g/g) was calculated as (W2−W0−W1)/W1.

The absorbency values of SAPs prepared in these examples, i.e., SAPs 1-5 and comparative SAP 1'-5', are shown below in Table 1-A and 1-B, respectively.

As demonstrated in Tables 1-A and 1-B, each of SAPs 1-5 had an absorbency value unexpectedly higher than that of its corresponding comparative SAP.

Of note, the chemical composition of SAP 3 was analyzed using the method described in Example 26 below. Itoconic acid was 19.5 mole % and triethylene glycol was 1.17 mole %, both values agreeing with the ratios used to prepare the SAP. Also, FTIR analysis was conducted (1718 $cm^{-1}$, corresponding to carboxyl groups), and $^1$H-NMR spectrum was obtained (ppm: 3.1-3.3, 2.7-2.9, 2.41, 2.24, 2.08).

TABLE 1-A

Absorbency values of SAPs prepared in Examples 1-5 (containing itaconic acid moieties)

| SAP | 1 | 2 | 3 | 4 | 5 |
|---|---|---|---|---|---|
| Triethylene glycol, mole % | 0.39 | 0.78 | 1.17 | 1.78 | 2.36 |
| Absorbency, g/g | 58 | 60 | 57 | 42 | 29 |

TABLE 1-B

Absorbency values of comparative SAPs 1'-5' (not containing itaconic acid moieties)

| Comparative SAP | 1' | 2' | 3' | 4' | 5' |
|---|---|---|---|---|---|
| Triethylene glycol, mole % | 0.39 | 0.78 | 1.17 | 1.78 | 2.36 |
| Absorbency, g/g | 27 | 20 | 19 | 15 | 11 |

EXAMPLES 6-15

In these examples, SAPs 6-15 were prepared using diethylene glycol instead of triethylene glycol, which was used in Examples 1-5.

In Examples 6-10, the amounts of itaconic acid, acrylic acid, N,N'-methylene bisacrylamide, 4,4'-azobis(4-cyanovaleric acid), NaOH, and water were the same as those used in Examples 1-5. The amounts of diethylene glycol varied as follows. In Example 6, 0.15 g of diethylene glycol (0.0014 mole, 0.39 mole %) was used; in Example 7, 0.30 g of diethylene glycol (0.0028 mole, 0.78 mole %) was used; in Example 8, 0.45 g of diethylene glycol (0.0042 mole, 1.17 mole %) was used; in Example 9, 0.675 g of diethylene glycol (0.0064 mole, 1.78 mole %) was used; and in Example 10, 0.9 g of diethylene glycol (0.0085 mole, 2.36 mole %) was used. The absorbency values of SAPs 6-10 thus prepared are shown in Table 2-A below.

Turning to Examples 11-15, SAPs 11-15 were prepared using the same materials as those used to prepare SAPs 6-10, except that N,N'-ethylene bisacrylamide (0.17 g, 0.001 mole) was used instead of N,N'-methylene bisacrylamide. The absorbency values of SAPs 11-15 are shown in Table 2-B below.

Comparative SAPs 6'-10' were prepared in the same manner as SAPs 6-10, except that itaconic acid was not used and that 26 g, instead of 21 g, of acrylic acid was used. Their absorbency values are shown in Table 2-C below.

TABLE 2-A

Absorbency values of SAPs 6-10 (containing itaconic acid and N,N'-methylene bisacrylamide moieties)

| SAP | 6 | 7 | 8 | 9 | 10 |
|---|---|---|---|---|---|
| Diethylene glycol, mole % | 0.39 | 0.78 | 1.17 | 1.78 | 2.36 |
| Absorbency, g/g | 54 | 64 | 60 | 40 | 30 |

TABLE 2-B

Absorbency values of SAPs 11-15 (containing itaconic acid and N,N'-ethylene bisacrylamide moieties)

| SAP | 11 | 12 | 13 | 14 | 15 |
|---|---|---|---|---|---|
| Diethylene glycol, mole % | 0.39 | 0.78 | 1.17 | 1.78 | 2.36 |
| Absorbency, g/g | 57 | 62 | 60 | 45 | 30 |

TABLE 2-C

Absorbency values of comparative SAPs 6'-10' (containing N,N'-methylene bisacrylamide but not itaconic acid moieties)

| Comparative SAP | 6' | 7' | 8' | 9' | 10' |
|---|---|---|---|---|---|
| Diethylene glycol, mole % | 0.39 | 0.78 | 1.17 | 1.78 | 2.36 |
| Absorbency, g/g | 25 | 18 | 16 | 12 | 11 |

As demonstrated in Tables 2-A and 2-B, the absorbency values of SAPs 6-10 are almost identical to those of SAPs 11-15, and unexpectedly, were much higher than those of comparative SAPs 6'-10'.

Further, SAP 7 was subjected to three additional water absorbency assays:

(i) In an unpressurized de-ionized water, this SAP was tested following the same assay described in Examples 1-5 except that de-ionized water, instead of a saline solution, was used and that the bag was air-dried, not dried by centrifuge.

(ii) In an unpressurized saline solution, the SAP was tested following the same assay described in Examples 1-5 except that the bag was air-dried, not dried by centrifuge.

(iii) In a pressurized de-ionized water, SAP 7 was tested following the same assay described in Examples 1-5 except that de-ionized water, instead of a saline solution, was used.

In addition, a commercial SAP, i.e., Taisap BC283FHA (manufactured by Formosa Plastics Corporation, Taiwan; containing 99.5-99.75% of poly(acrylic acid) and 0.25-0.5 wt % of N,N'-methylene bisacrylamide), was also subjected to the just-mentioned three assays.

The water absorbency values of SAP 7 and Taisap BC283FHA thus obtained are shown in Table 2-D below. Unexpectedly, SAP 7 showed much greater water absorbency than Taisap BC283FHA in all three assays.

TABLE 2-D

Absorbency values (g/g) of SAP 7 and Taisap BC283FHA

| SAP | Unpressurized de-ionized water | Unpressurized saline solution | Pressurized de-ionized water |
|---|---|---|---|
| SAP 7 | 1100 | 102 | 553 |
| Taisap BC283FHA | 710 | 66 | 255 |

Note that SAP 8 was analyzed using the method described in Example 26 below. Itoconic acid was 19.5 mole % and diethylene glycol was 1.17%, both values agreeing with the ratios used to prepare the SAP. Also, FTIR analysis was conducted (1710 cm$^{-1}$, corresponding to carboxyl groups), and $^1$H-NMR spectrum was obtained (ppm: 3.1-3.3, 2.7-2.9, 2.43, 2.21, 2.1).

EXAMPLES 16-25

In these examples, SAPs 16-25 were prepared using ethylene glycol instead of triethylene glycol used in Examples 1-5.

In Examples 16-20, the amounts of itaconic acid, acrylic acid, N,N'-methylene bisacrylamide, 4,4'-azobis(4-cyanovaleric acid), NaOH, and water were the same as those used in Examples 1-5. On the other hand, different amounts of ethylene glycol were used. More specifically, in Example 16, 0.09 g of ethylene glycol (0.0014 mole, 0.39 mole %) was used; in Example 17, 0.17 g of ethylene glycol (0.0028 mole, 0.78 mole %) was used; in Example 18, 0.26 g (0.0042 mole, 1.17 mole %) was used; in Example 19, 0.40 g (0.0064 mole, 1.78 mole %) was used; and in Example 20, 0.53 g (0.0085 mole, 2.36 mole %) was used. The absorbency values of SAPs 16-20 are shown in Table 3-A below.

In Examples 21-25, SAPs 21-25 were prepared using the same materials as those used to prepare SAPs 16-20, except that N,N'-ethylene bisacrylamide (0.17 g, 0.001 mole) was used instead of N,N'-methylene bisacrylamide. The absorbency values of SAPs 21-25 are shown in Table 3-B below.

Comparative SAPs 16'-20' were prepared in the same manner as SAPs 16-20, except that itaconic acid was not used and that 26 g, instead of 21 g, of acrylic acid was used. Their absorbency values are shown in Table 3-C below.

As shown in Tables 2-A and 2-C, the absorbency values of SAPs 16-20 are unexpectedly much higher than those of corresponding comparative SAPs 16'-20'. Table 2-B shows that the absorbency values of SAPs 21-25 are almost identical to those of SAPs 16-20, and, as such, are also unexpectedly much higher than those of comparative SAPs 16'-20'.

TABLE 3-A

Absorbency values of SAPs 16-20 (containing itaconic acid and N,N'-methylene bisacrylamide moieties)

| SAP | 16 | 17 | 18 | 19 | 20 |
|---|---|---|---|---|---|
| Ethylene glycol, Mole % | 0.39 | 0.78 | 1.17 | 1.78 | 2.36 |
| Absorbency, g/g | 58 | 65 | 59 | 43 | 32 |

TABLE 3-B

Absorbency values of SAPs 21-25 (containing itaconic acid and N,N'-ethylene bisacrylamide moieties)

| SAP | 21 | 22 | 23 | 24 | 25 |
|---|---|---|---|---|---|
| Ethylene glycol, Mole % | 0.39 | 0.78 | 1.17 | 1.78 | 2.36 |
| Absorbency, g/g | 59 | 63 | 58 | 45 | 29 |

TABLE 3-C

Absorbency values of comparative SAPs 16'-20' (containing N,N'-methylene bisacrylamide but not itaconic acid moieties)

| Comparative SAP | 16' | 17' | 18' | 19' | 20' |
|---|---|---|---|---|---|
| Ethylene glycol, Mole % | 0.39 | 0.78 | 1.17 | 1.78 | 2.36 |
| Absorbency, g/g | 25 | 18 | 16 | 12 | 11 |

Note that SAP 18 was analyzed using the method described in Example 26 below. Itoconic acid was 19.5 mole % and ethylene glycol was 1.14%, both values agreeing with the ratios used to prepare the SAP. Also, FTIR analysis was conducted (1712 $cm^{-1}$, corresponding to carboxyl groups), and $^1$H-NMR spectrum was obtained (ppm: 3.1-3.3, 2.7-2.9, 2.4, 2.0).

EXAMPLE 26

The chemical compositions of four SAPs were determined following the procedures described below.

0.2 g of SAP 13, prepared in Example 13, was mixed with 25 ml of $D_2O$ and 1.2 ml of $D_2SO_4$. Under a nitrogen atmosphere, the mixture was stirred at 80° C. for 0.5 hour and then at 120° C. for 0.2 hour to hydrolyze the SAP to itaconic acid, acrylic acid, diethylene glycol, and 1,2-ethylenediamine (a hydrolysis product of N,N'-ethylene bisacrylamine). The SAP hydrolysis mixture was then cooled and analyzed by NMR, HPLC, GC, and FTIR. FTIR showed a broad peak at 1710 $cm^{-1}$, corresponding to the peaks of the carboxyl groups of itaconic acid and acrylic acid. $^1$H-NMR showed peaks at 3.1-3.3 ppm (corresponding to methylene protons of itaconicd acid), 2.7-2.9 ppm (corresponding to methine backbone protons), and 2.41 ppm (corresponding to methylene protons of acrylic acid).

The mole % of itaconic acid/(itaconic acid and acrylic acid) was 19.5 mole %, measured by NMR. HPLC analysis showed that the mole % of diethylene glycol/(itaconic acid and acrylic acid) was 1.01 mole % and the mole % of 1,2-ethylenediamine/(itaconic acid and acrylic acid) was 0.23 mole %.

As pointed out in Example 13 above, 19.5 mole % of itaconic acid, 1.17 mole % of diethylene glycol, and 0.27 mole % of N,N'-ethylene bisacrylamine were used to prepare SAP 13.

The mole % of itaconic acid, diethylene glycol, and the 1,2-ethylenediamine in the hydrolysis mixture were almost the same as those of itaconic acid, diethylene glycol, and N,N'-ethylene bisacrylamine used in Example 13 to prepare this SAP. This unexpected closeness indicates that the mole % of itaconic acid in a SAP of this invention can be determined by analyzing a hydrolysis mixture of the SAP.

The chemical compositions of SAPs 3, 8, and 18 were also determined. The results were shown in Examples 1-5, 6-15, and 16-25, respectively.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A process for preparing a superabsorbent polymer network, the process comprising:
   providing a mixture comprising a first monomer, a second monomer, a first crosslinker, a second crosslinker, and an initiator in a solvent at 70 to 100° C., to yield crosslinked copolymers formed of the first monomer, the second monomer, and the first crosslinker; and
   raising the temperature of the mixture to 100 to 150° C., to induce crosslinking between the copolymers and the second crosslinker, thereby yielding the superabsorbent polymer network,
   wherein
      the first monomer, 8 to 23 mole %, is itaconic acid, fumaric acid, itaconamic acid, maleic acid, methyl maleic acid, or a combination thereof;
      the second monomer, 75 to 92 mole %, is acrylic acid, 2-hydroxyethyl methacrylate, methacrylic acid, acrylamide, methacrylamide, acryloxypropionic acid, or a combination thereof;
      the first crosslinker, 0.1 to 1 mole %, is N,N'-methylene bisacrylamide, N,N'-ethylenebisacrylamide, 1,3-propylene bisacrylamide, ethylene diacrylate, di(ethylene glycol) diacrylate, tri(ethylene glycol) diacrylate, trimethylolpropane triacrylate, pentaerythritol triacrylate, or a combination thereof; and the second crosslinker, 0.2 to 1.5%, is ethylene glycol, diethylene glycol, triethylene glycol, propanediol, butanediol, pentanediol, hexanediol, methylenediamine, ethylenediamine, trimethylenediamine, or a combination thereof.

2. The process of claim 1, wherein the mixture contains 12 to 20 mole % the first monomer, 79 to 87 mole % the second monomer, 0.2 to 0.3 mole % the first crosslinker, and 0.3 to 1.2 mole % the second crosslinker.

3. The process of claim 1, wherein the first monomer is itaconic acid and the second monomer is acrylic acid.

4. The process of claim 1, wherein the second crosslinker is ethylene glycol, diethylene glycol, triethylene glycol, or a combination thereof.

5. The process of claim 1, wherein the first crosslinker is N,N'-methylene bisacrylamide, N,N'-ethylenebisacrylamide, or a combination thereof.

6. The process of claim 2, wherein the first monomer is itaconic acid and the second monomer is acrylic acid.

7. The process of claim 2, wherein the second crosslinker is ethylene glycol, diethylene glycol, triethylene glycol, or a combination thereof.

8. The process of claim 2, wherein the first crosslinker is N,N'-methylene bisacrylamide, N,N'-ethylenebisacrylamide, or a combination thereof.

9. The process of claim 3, wherein the second crosslinker is ethylene glycol, diethylene glycol, triethylene glycol, or a combination thereof.

10. The process of claim 1, wherein the first crosslinker is N,N'-methylene bisacrylamide, N,N'-ethylenebisacrylamide, or a combination thereof.

11. The process of claim 4, wherein the first crosslinker is N,N'-methylene bisacrylamide, N,N'-ethylenebisacrylamide, or a combination thereof.

12. The process of claim 6, wherein the second crosslinker is ethylene glycol, diethylene glycol, triethylene glycol, or a combination thereof.

13. The process of claim 6, wherein the first crosslinker is N,N'-methylene bisacrylamide, N,N'-ethylenebisacrylamide, or a combination thereof.

14. The process of claim 7, wherein the first crosslinker is N,N'-methylene bisacrylamide, N,N'-ethylenebisacrylamide, or a combination thereof.

15. The process of claim 9, wherein the first crosslinker is N,N'-methylene bisacrylamide, N,N'-ethylenebisacrylamide, or a combination thereof.

16. The process of claim 12, wherein the first crosslinker is N,N'-methylene bisacrylamide, N,N'-ethylenebisacrylamide, or a combination thereof.

* * * * *